(12) United States Patent
  Spanos

(10) Patent No.: US 12,318,731 B2
(45) Date of Patent: Jun. 3, 2025

(54) SELF-PURGING WATER PRESSURE REGULATOR AND REVERSE OSMOSIS SYSTEM HAVING A SELF-PURGING WATER PRESSURE REGULATOR

(71) Applicant: Michael Spanos, Fort Lauderdale, FL (US)

(72) Inventor: Michael Spanos, Fort Lauderdale, FL (US)

( * ) Notice: Subject to any disclaimer, the term of this patent is extended or adjusted under 35 U.S.C. 154(b) by 707 days.

(21) Appl. No.: 17/678,859

(22) Filed: Feb. 23, 2022

(65) Prior Publication Data
    US 2022/0314170 A1    Oct. 6, 2022

Related U.S. Application Data

(60) Provisional application No. 63/168,288, filed on Mar. 31, 2021.

(51) Int. Cl.
    *B01D 61/10* (2006.01)
    *B01D 61/02* (2006.01)
    (Continued)

(52) U.S. Cl.
    CPC ........... *B01D 61/10* (2013.01); *B01D 61/025* (2013.01); *B01D 61/08* (2013.01); *C02F 1/441* (2013.01);
    (Continued)

(58) Field of Classification Search
    CPC ............ F15B 2211/50; F15B 2211/505; F15B 2211/50545; F15B 2211/555; F15B 2211/50509; F15B 2211/05018; F15B 2211/50563; F15B 2211/528; F15B 2211/55; F15B 2211/56; F15B 2211/565; F15B 2211/57; F15B 2211/6055; F15B 2211/6653; G05D 16/00; G05D 16/02; G05D 16/024; G05D 16/028; G05D 16/08; G05D 16/10; B01D 37/00; B01D 37/04; B01D 61/00; B01D 61/002; B01D 61/02; B01D 61/025; B01D 61/0256;
    (Continued)

(56) References Cited

U.S. PATENT DOCUMENTS 4,744,900 A    5/1988    Bratt
4,973,408 A    11/1990   Keefer
(Continued)

*Primary Examiner* — Allison G Fitzsimmons
(74) *Attorney, Agent, or Firm* — Derek Fahey, Esq.; The Plus IP Firm, PLLC

(57) ABSTRACT

A self-purging water pressure regulator and system using same is disclosed. The self-purging water pressure regulator includes a housing assembly and a chamber within the housing assembly. The housing assembly has a housing assembly inlet and a housing assembly outlet. Within the housing assembly are a plunger and a piston, each having and open position and a closed position. A biasing element within the housing assembly exerts a force on the plunger that biases the plunger and piston into the closed position. The plunger and piston are in the open position if water exerts a second force on the piston that exceeds the force. The housing assembly further includes a bypass channel. The bypass channel provides fluid communication between the housing assembly inlet and the housing assembly outlet. The bypass channel allows air to continuously escape even in the closed position.

17 Claims, 8 Drawing Sheets

(51) Int. Cl.
  *B01D 61/08* (2006.01)
  *C02F 1/44* (2023.01)
  *G05D 16/00* (2006.01)

(52) U.S. Cl.
  CPC .... *B01D 2313/16* (2013.01); *B01D 2313/243* (2013.01); *C02F 2301/043* (2013.01)

(58) Field of Classification Search
  CPC ........ B01D 61/08; B01D 61/10; B01D 61/12; B01D 63/00; B01D 63/08; B01D 63/081; B01D 65/00; B01D 2201/20; B01D 2201/202; B01D 2201/31; B01D 2201/34; B01D 2311/14; B01D 2313/00; B01D 2313/16; B01D 2313/18; B01D 2313/20; B01D 2313/24; B01D 2313/10
  See application file for complete search history.

(56) References Cited

U.S. PATENT DOCUMENTS

| | | | |
|---|---|---|---|
| 4,997,569 A * | 3/1991 | Sirkar | B01D 61/28 |
| | | | 210/639 |
| 5,261,792 A | 11/1993 | Schoenmeyr | |
| 5,800,136 A | 9/1998 | Kurth et al. | |
| 6,468,431 B1 | 10/2002 | Oklejas | |
| 8,083,936 B1 * | 12/2011 | Walker | C02F 1/441 |
| | | | 251/122 |
| 9,713,563 B2 | 7/2017 | Mansur, Jr. et al. | |
| 2006/0013219 A1 | 1/2006 | Neilson et al. | |
| 2007/0181473 A1 | 8/2007 | Manth et al. | |
| 2008/0011680 A1 * | 1/2008 | Partridge | B01D 71/642 |
| | | | 585/818 |
| 2011/0108484 A1 | 5/2011 | Liberman et al. | |

\* cited by examiner

SELF-PURGING WATER PRESSURE REGULATOR AND REVERSE OSMOSIS SYSTEM HAVING A SELF-PURGING WATER PRESSURE REGULATOR

CROSS-REFERENCE TO RELATED APPLICATIONS

This application claims the benefit of the filing date of U.S. Provisional Patent Application Ser. No. 63/168,288, entitled SELF-PURGING WATER PRESSURE REGULATOR AND REVERSE OSMOSIS SYSTEM HAVING A SELF-PURGING WATER PRESSURE REGULATOR, which was filed on Mar. 31, 2021, and the subject matter of which is incorporated herein.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of pressure regulators, and more specifically to the field of self-purging water pressure regulators.

BACKGROUND

Reverse osmosis membrane systems are typically used to remove solutes from a water source. For example, a common application of reverse osmosis systems is to filter out salt ions from a saltwater source to create freshwater. To remove the solutes from a water source, the water source is pumped as feed water into a high-pressure pump which then forces the feed water into a reverse osmosis membrane. The reverse osmosis membrane is semi-permeable to water molecules thereby trapping solutes from permeating the membrane thus creating a freshwater outlet. To filter out the solute and create freshwater the feed water must be pumped at a high pressure to force the feed water across the reverse osmosis membrane. Air molecules trapped within the feed water decrease the water pressure of the feed water. As the air within the feed water builds up, the air decreases the water pressure where the feed water cannot permeate the reverse osmosis membrane and the high-pressure pump cannot maintain pumping water at a high pressure.

Currently, the solution to maintaining a high-water pressure is to have a water concentrate line connected to the reverse osmosis membrane and a water pressure regulator. Feed water that does not permeate the reverse osmosis membrane moves through a water concentrate line to the pressure regulator. The water pressure regulator backs up the feed water to increase the water pressure across the membrane. However, because air is trapped within the feed water, the buildup of water pressure is timely and too much trapped air can prevent the water pressure from reaching the necessary level for the feed water to permeate the reverse osmosis membrane.

Therefore, the water pressure regulators are equipped with a series of valves that must be opened to purge the air from the feed water to allow the buildup of water pressure. The purging of air from the concentrate line is usually periodically performed manually or thorough the use of electronic equipment configured to monitor the pressure and open the values to purge the air when water pressure is too low. These methods of purging the air from water are inefficient, time consuming, susceptive to failure because of the components and controls required to purge the air and may increase the costs associated with reverse osmosis membrane systems.

As a result, there exists a need for improvements over the prior art and more particularly for a more efficient way of purging air from a water pressure regulator and from reverse osmosis systems.

SUMMARY

A self-purging water pressure regulator and reverse osmosis system having a self-purging water pressure regulator is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a self-purging water pressure regulator is disclosed. The system includes a housing assembly and a chamber within the housing assembly. The housing assembly has a housing assembly inlet and a housing assembly outlet. Within the housing assembly are a plunger and a piston having and open position and a closed position. A biasing element within the housing assembly exerts a first force on the plunger that biases the plunger and piston into the closed position. When water exerts a second force on the piston that exceeds the first force the plunger and piston are in the open position. The housing assembly further includes a bypass channel where the bypass channel provides fluid communication between the housing assembly inlet and the housing assembly outlet.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, serve to explain the principles of the disclosed embodiments. The embodiments illustrated herein are presently preferred, it being understood, however, that the disclosure is not limited to the precise arrangements and instrumentalities shown, wherein.

DETAILED DESCRIPTION

Figure 1A:
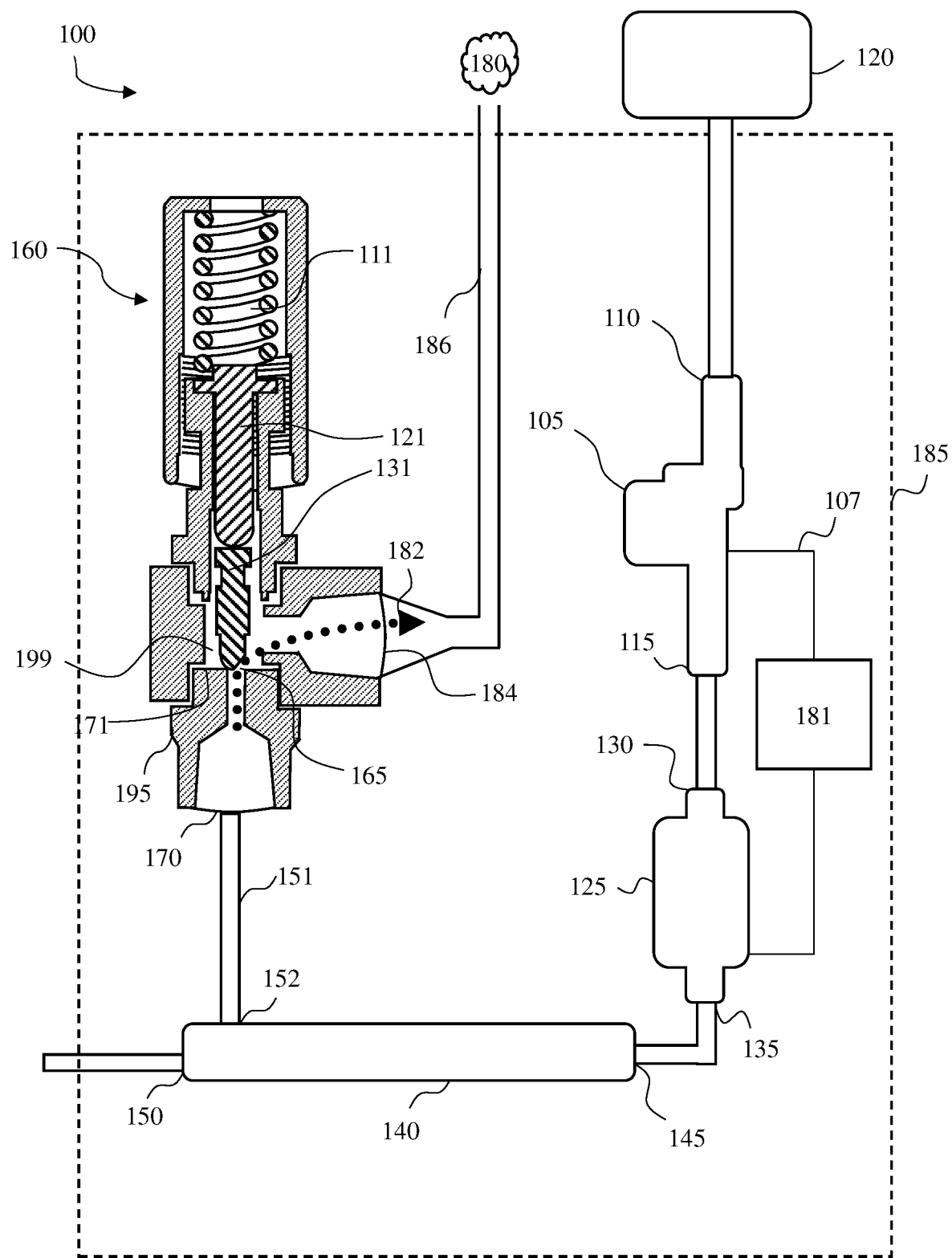
FIG. 1A is a diagram of a self-purging water pressure regulator and reverse osmosis system having a self-purging water pressure regulator, wherein the pressure regulator is illustrated in a cross-sectional view, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a self-purging water pressure regulator and reverse osmosis system having a self-purging water pressure regulator. The self-purging water pressure regulator and reverse osmosis system having a self-purging water pressure regulator improves upon the prior art by having a bypass channel within the housing assembly of a water pressure regulator. The bypass channel maintains fluid communication between the housing assembly inlet and the housing assembly outlet. When a biasing element within the housing assembly exerts a first force on the plunger, the plunger and piston are in a closed position where the water pressure within the system can build up to allow force the saltwater across the reverse osmosis membrane. While in the closed position, the bypass channel continuously allows air to escape through the bypass channel without the need of manually purging the air through valves or through the use of electronic equipment. Therefore, because air can continuously escape the system, trapped air will not decrease the water pressure of the system. This causes the system to be more efficient by allowing a high-pressure pump to force saltwater across the reverse osmosis membrane while maintaining a high-water pressure and eliminates the need to purge the system of trapped air.

Moreover, the prior art requires that the user manually purge the air within the water pressure regulator system using a series of pressure release valves. These components are proven to fail periodically. Over time the spring used in a pressure release valve loses tension causing leaks and inaccuracy that prevent the system from reaching the requisite water pressure to enable the permeation of the reverse osmosis membrane. If the valve is not addressed and replaced quickly systems can acquire problems and even fail. These components may be costly and systems failures even more so. Furthermore, it is possible in some embodiments for a reverse osmosis water storage tank to be attached the reverse osmosis membrane freshwater outlet. These storage tanks will also fail if the water pressure is too high or too low, highlighting the need for an efficient water pressure regulator. Based upon prior art, this self-purging water pressure regulator and reverse osmosis system having a self-purging water pressure regulator proves to be more reliable and cost efficient for a reverse osmosis water filtration system.

Figure 1B:
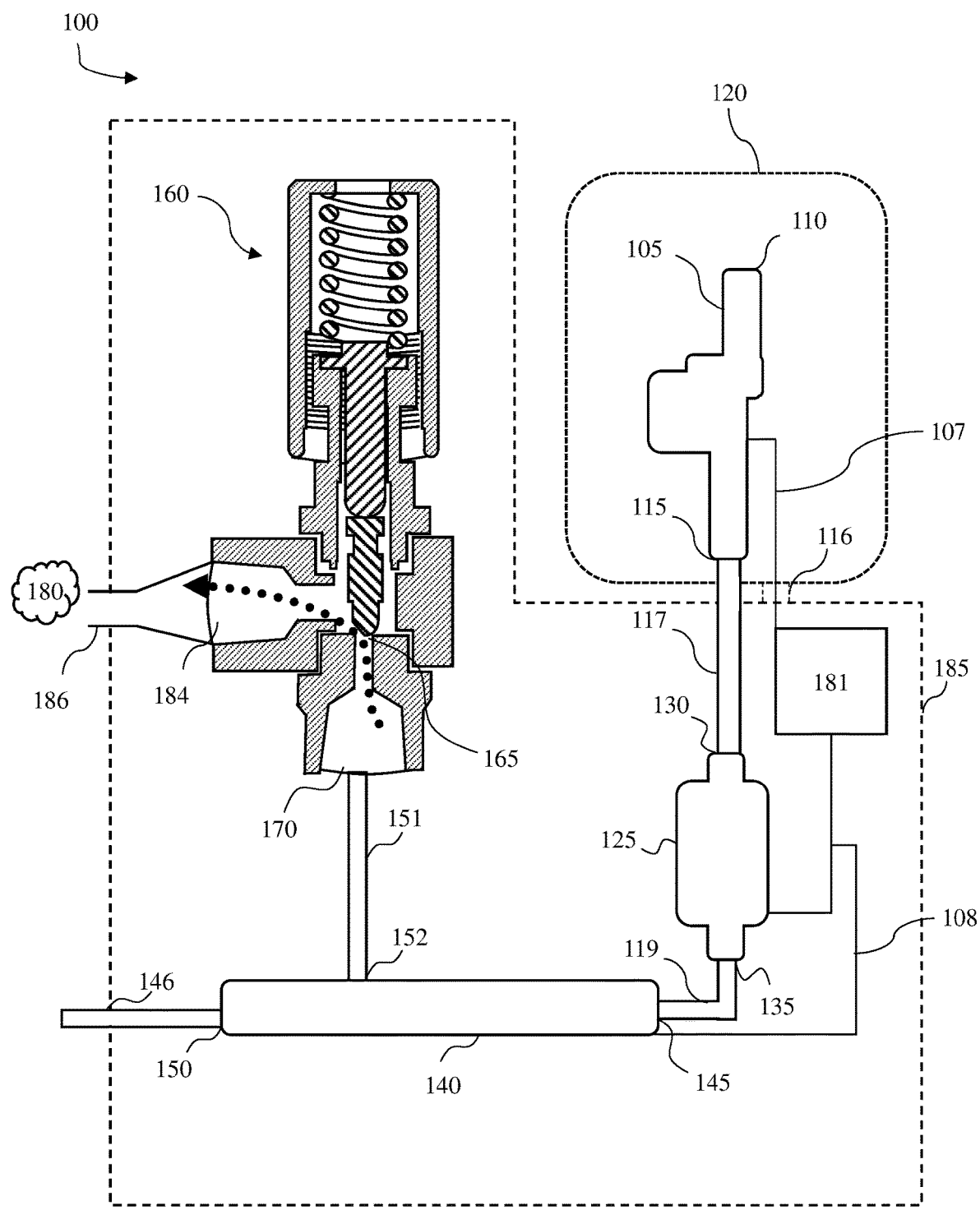
FIG. 1B is a second diagram of the self-purging water pressure regulator and reverse osmosis system having a self-purging water pressure regulator, wherein the pressure regulator is illustrated in a cross-sectional view, according to a second example embodiment.

Referring now to the FIGS. 1A and 1B, FIGS. 1A and 1B are a diagram of a self-purging water pressure regulator and reverse osmosis system 100 having a self-purging water pressure regulator 160, according to an example embodiment. The reverse osmosis system 100 has a first water pump 105 where the first water pump has a first water pump inlet 110 and a first water pump outlet 115. The first water pump inlet is in communication with a saltwater source 120. The first water pump, according to an example embodiment, is in fluid communication with a saltwater source using tubing and piping, such as polyvinyl chloride pipes for example, where the tubing and piping is configured to allow saltwater to move from the saltwater source to the first pump inlet. The first pump may be a water pump moving water at a low pressure.

The system further includes a high-pressure water pump 125 having a second water pump inlet 130 and a second water pump outlet 135 where the second water pump is a high-pressure water pump. The first water pump outlet is in fluid communication with the second water pump inlet. The first water pump, according to an example embodiment, is in fluid communication with the second water pump using a conduit 117, such as polyvinyl chloride pipes for example, where the tubing and piping is configured to allow saltwater to move from the first water pump outlet to the second water pump inlet. The first water pump is configured to move saltwater at a low water pressure to the self-purging water pressure regulator 160 via the second water pump and a reverse osmosis membrane 140. The first pump moves saltwater into the second water pump inlet at a low water pressure. The first water pump moves saltwater into to the second water pump inlet where the second water pump then pumps water out through the second water pressure outlet at a high-water pressure (when fully operational and the system is purged) relative to the low water pressure output by the first water pump. The first water pump and the second water pump are in electrical communication with a power source 181. The power source 181 is configured to supply power to the first pump and second pump for the first pump and second pump to move saltwater through the system.

Additionally, the second water pump is in fluid communication with the reverse osmosis membrane 140 via conduit 119. Specifically, the second water pump outlet is in fluid communication via conduit 119 with the reverse osmosis membrane inlet 145. The second water pump, according to an example embodiment, is in fluid communication with the reverse osmosis membrane using conduit 119, such as polyvinyl chloride pipes for example, where the tubing and piping is configured to allow saltwater to move at a high-water pressure from the second water pump outlet to the reverse osmosis membrane inlet. The second water pump moves the saltwater into the reverse osmosis membrane inlet.

The reverse osmosis membrane is configured to force move freshwater to a freshwater outlet 150 when a predetermined water pressure acts on the reverse osmosis membrane. The predetermined water pressure, according to an example embodiment, is 800 pounds per square inch (psi). However, in other embodiments, other predetermined water pressure may be used and are within the spirit and scope of the present invention. When the predetermined water pressure is not reached, the saltwater moves through the saltwater outlet 155 where the saltwater outlet is in fluid communication with a self-purging water pressure regulator 160 via conduit 151. The reverse osmosis membrane, according to an example embodiment, is in fluid communication with the self-purging water pressure regulator, specifically, the saltwater outlet is in fluid communication with the water pressure regulator inlet 170, using conduit 151, such as polyvinyl chloride pipes for example, where the tubing and piping is configured to allow saltwater to move to the self-purging water pressure regulator where the self-purging water pressure regulator can cause the saltwater to build up back pressure. The back pressure is high water pressure which will cause the reverse osmosis membrane to force move fresh water to a freshwater outlet 150 when the back pressure builds up enough to reach the predetermined water pressure needed to act on the reverse osmosis membrane. The back pressure is caused by the first water pump pushing water to the high pressure regulator and causing air to leave the system via the bypass channel (further explained below).

The self-purging water pressure regulator includes a housing assembly 195, a chamber 199 within the housing assembly, a housing assembly inlet 170, a housing assembly outlet 184, a plunger 121 within the housing assembly, a piston 131 within the housing assembly 131, a biasing element 111 within the housing assembly, and a wall 171 within the housing assembly.

The housing assembly contains the plunger 121, piston 131, and a biasing element 111. The housing has an inlet in fluid communication with the saltwater outlet of the reverse osmosis membrane, the bypass channel and an outlet. The chamber is generally the void that houses the piston and/or the plunger and is the primary channel of fluid communication between the water pressure regulator inlet and the water pressure regulator outlet when the piston and plunger are in an open configuration (as shown in FGI. 2B). The system improves upon the prior art by allowing, in certain embodiments, air to enter the chamber through a bypass (even when the piston and plunger are in the closed position), which may be a cutout on the piston and/or an innermost wall of the innermost channel of the inlet that feeds into the chamber. The bypass allows air to purge or exit the system when the piston and plunger are in a closed configuration, i.e., the piston and/or plunger blocks fluid communication between the inlet and the outlet. In other embodiments, the bypass may be a channel that provides fluid communication between the inlet and outlet wherein the air does not purge or exit the system and/or water pressure regulator through the chamber.

The biasing element is a spring configured to exert a downward force onto the piston. The biasing element is a tension spring configured to exert an outward force onto the plunger and compress when the water pressure being exerted on the piston exceeds a predetermined PSI. However, other embodiments may be used and are within the spirit and scope of the present invention.

Furthermore, the self-purging water pressure regulator 160 has a bypass channel 165 that purges air 180 from the system before the predetermined amount of water pressure is reached. The bypass channel allows any buildup of excess air to escape the system through the bypass channel. Because air can continuously escape the system through the bypass channel even when the regulator is in the closed position, trapped air can be removed from the system without the need for sophisticated controls. This causes the system to be more efficient by allowing a high-pressure pump to force saltwater across the reverse osmosis membrane while maintaining a high-water pressure. While the self-purging water pressure regulator has the plunger and piston in the closed position, and the first and second pumps are pumping water into the system before the predetermined pressure is attained, the system can increase the water pressure between the reverse osmosis membrane and the self-purging water pressure regulator because the system automatically purges air that may decrease the water pressure from the system. The system automatically purges air from the system so that the second water pump can pump water at a high-water pressure in fluid communication with the reverse osmosis membrane and the self-purging water pressure regulator. The air is purged in the direction as indicated by the dotted arrowed line 182 such that the air 180 escapes the system from the water pressure regulator inlet 170, through the bypass channel 165, and out of the housing assembly outlet 184.

The size of the channel is configured to allow the buildup of water pressure to reach and/or exceed the predetermined water pressure or PSI. This channel will allow air to diffuse out of the system. Ideally, the channel is small enough in width to still allow pressure buildup. If the channel is too large, then the water will rapidly diffuse out of the channel and will not build up a back pressure. Failure to build up a back pressure with prevent the feed water from permeating the reverse osmosis membrane. When the channel is configured in dimension to allow only the air to diffuse or controlled leak out of the system, then the water will continue to build up within the system to allow the system to reach the pressure needed to permeate the membrane. Because of the dimension of the bypass the diffusion of water to leak out of the channel with the air is limited by its capillary action and surface tension of water within the pressure regulator. When the event that water purges out of the bypass channel, the channel is configured such that water will leak out of the system at a slower rate than it is filling up the water pressure regulator inlet. Therefore, the system will still build up water pressure to allow the feed water to permeate the membrane.

The system may be contained within an enclosure 185. In certain embodiments, the enclosure 185, may be a vessel such as a boat. The enclosure houses the elements of the system, and its dimensions depends on the scale of the system. For example, in one embodiment, the system is housed within a room of a vessel or building. In another embodiment, the system may be contained within a watertight portable container for example. In other embodiments, the enclosure may be a box or container so that a person or operator may easily transport the system. In certain embodiments, the container may be a portable waterproof container having a lid and configured for storing all of the components of the system. In certain embodiments, components of the system, such as the power source or the first pump may be removable from the enclosure.

Referring now to FIG. 1B, a reverse osmosis system 100 having a self-purging water pressure regulator 160 is shown where the system is enclosed within a portable container thereby defining a portable reverse osmosis system. The portable reverse osmosis system may be at least partially removable and housed and contained within a portable enclosure 185 that is a portable container.

The portable container or housing may be comprised of polymeric materials such as polycarbonates, such as Acrylonitrile butadiene styrene (ABS plastic), Lexan™, and Makrolon™, or other materials having waterproof type properties. Some components of the system need to be waterproof, for example all electrical wiring needs durable protection. The housing may be formed from a single piece of material or from several individual pieces joined or coupled together. The shape of the container may vary as long as each component can be organized and operational within. In some embodiments, the container may be rectangular, or cylindrical, in other embodiments the enclosure 185 may be represented by a vessel or compartment in a vessel. The components of the housing may be manufactured from a variety of different processes including an extrusion process, a mold, shearing, punching welding, folding etc. However, other types of processes may also be used and are within the spirit and scope of the system. All components remain operational within the housing. As shown in FIGS. 1A and 1B, the container may house of all of the components. In certain embodiments, when in operation, the system may allow the user to move the pump outside of the container (as shown in FIG. 1B) so that the pump may be submerged in the saltwater source. In certain embodiments, conduits 116, 117, 186 may be flexible conduits that are connected to the components of the system that may extend out of the system.

As mentioned above, in one embodiment, the system includes a first water pump 105. The first water pump is a low-pressure water pump. The first water pump is configured to retrieve water from a water source and pump it at a low first water pump pressure that is lower than water pressure provided by a second pump. The first water pump pressure of the first water pump is generally a low water pressure respective to the second water pump that pumps water at a high-water pressure. In one embodiment, the first water pump may be a submersible water pump. However, in other embodiments, the first water pump may be any water pump within the spirit and scope of the disclosure configure to output water at a low water pressure. Submersible pumps are highly efficient for this system. Because the pump is submerged under water, there is a positive fluid pressure at the inlet of the pump creating greater efficiency by requiring less energy to start. Another benefit to submersible pumps is the automatic cooling factor from the surrounding water, preventing the motor from overheating.

In embodiments where the pump is not submersible, the housing of the portable reverse osmosis system, such as enclosure 185 is configured to enclose the first water pump.

The housing may have an opening to allow a conduit to feed into a saltwater source. Moreover, where the first water pump is submersible, the enclosure may be configured to house the first water pump in a non-operational configuration where the first water pump can be removed from the enclosure and submerged into the water source. Other pumps may be used for the first and second pumps and are within the spirit and scope of the disclosure.

The first water pump has a first water pump inlet 110, a first water pump outlet 115, where the first water pump is a low-pressure water pump configured for providing a first water pump water pressure, where the first water pump inlet is configured to be in fluid communication with a saltwater source. This pump supplies enough pressure, ranging from 5-100 psi, so that it may act as a primer for the system. The submersible device may be lowered into the water source by hand, or by automation as other embodiments may display. This pump remains in the saltwater source for the duration of the process.

Once the primer pump or first water pump is submerged, power must be turned on. Power can be supplied to the system in a multitude of ways. For example, the user may connect the system to an external power source 181, such as a boat's battery or RV's battery, or an internal power source such as a standard dry cell battery or rechargeable battery. Commonly used dry cell batteries include zinc-carbon batteries, alkaline-cell batteries, and mercury batteries. Commonly used rechargeable batteries are lead-acid, nickel-cadmium, nickel-metal hydride, and lithium-ion. Other batteries may be used and are within the spirit and scope of the disclosure. Additionally, the system may be connected to a DC power source, such as solar cells. Because in certain embodiments the system is portable, charging the battery may require a renewable energy source such as solar panels electrically connected to the power source. In certain embodiments a power source may power both water pumps, wherein other embodiments there may be two power sources, one for each water pump. In one embodiment, the power source 181 will be connected to the submersible pump and the high-pressure pump via electrical conductors 107 and 108. Electrical conductors 107 may include additional seals, housing or conduits 116 that surround the electrical conductors 107 so that when first water pump 105 is inserted into the water it does not cause a short or other electrical or safety issues. An example of a safe conduit material is silicon. For example, in one embodiment, when in operation, the submersible pump may be removed from the portable container and inserted into the saltwater source such that flexible conduit 117 extends between the portable container and the saltwater source. Additionally, conduit 116 housing the electrical connections extends between the portable container and the saltwater source. Additionally, conduit 186 may be a flexible conduit that extend from the outlet 184 of the regulator outside the portable container or enclosure.

This power source may be inside the housing or outside the enclosure 185. For example, as shown in FIG. 1B, the power source is inside the container. Once the system is turned on or energized, the first water pump and second water pump will be begin to pump water. When initially turned on the first water pump will be begin to move salt water from a salt water source into the submersible pump then into the high-pressure water pump 125 via conduit 117. The first water pump is in fluid communication with the high-pressure pump and reverse osmosis membrane. When the system is turned on, the power source energizes both the primer pump or first water pump 105 and the high-pressure water pump 125. Next, the primer pump or first water pump beings pumping water from the first water pump into the system. Additionally, shortly after the primer pump and the high-pressure water pump is turned on or energized, the high-pressure water pump will pump water but because the high-pressure water pump may not have water within the pump, it may not move water effectively until it is primed. Without the primer pump and the self-priming pressure regulator, the high-pressure water pump 125 will need to be manually primed so that pressure in the pump can build up so that water pressure in the high-pressure pump may operate properly. Stated differently, because of the bypass channel provided by the self-purging water pressure regulator 160, air can exit the system when the self-purging water pressure regulator is in the closed position before self-priming pressure regulator moves into an open state thereby allowing pressure to build in the high-pressure water pump 125 so that it may begin to pump water out of the second water pump outlet 135 into and into reverse osmosis membrane at the predetermined pressure. The predetermined pressure is the pressure that is required for the reverse osmosis membrane to make fresh water. As mentioned above, the predetermined pressure may be adjusted, but, typically, it is around 800 PSI. The predetermined pressure depends on the reverse osmosis membrane such that the predetermine pressure is configured to allow feed water to permeate the reverse osmosis membrane. Additionally, the pressure provided by the biasing element 111 may be adjusted so that it provides a back pressure to the reverse osmosis membrane such that the reverse osmosis membrane functions correctly.

As the primer pump or first water pump pumps water, water flows from the primer pump through the system and into the high-pressure water pump 125 or second water pump, this fluid prevents the high-pressure pump from burning out. Typically, the system is purged via the bypass channel in less than a minute, however, if the first water pump is not working, and the system is not purged thereby not causing a back pressure to the second water pump, the second water pump may be damaged. The water then flows into the reverse osmosis membrane 140 and further into the self-purging water pressure regulator 160. When the system is initially turned on the primer pump or first water pump is used to purge air from the system as will be further explained below.

The second water pump has a second water pump inlet 130, and a second water pump outlet 135. The second water pump is a high-pressure water pump configured for providing a second water pump water pressure. This second water pump may be a positive displacement pump, meaning energy is added to a fluid by applying a force by use of a mechanical device. In one embodiment the high-pressure pump may be using a piston water pump, in another embodiment a plunger may be in use. There is a multitude of water pumps that can build the predetermined pressure this system needs. However mechanically, plunger pumps are better suited for high pressure than piston pumps. Plunger pumps are very versatile with the material the manifolds are made of. These materials may include brass, nickel, aluminum, bronze, and steel. The predetermined pressure in this pump is at least 700 PSI, a pressure strong enough to force the water through the membrane while trapping the contaminants and allowing the clean water to pass through the freshwater outlet 150. The predetermined pressure provided by the second water pump is the pressure that the second water pump pumps out of the second water pump outlet.

As mentioned above, a reverse osmosis membrane 140 having a reverse osmosis membrane inlet 145, a freshwater outlet 150, and a saltwater outlet 152, where the reverse osmosis membrane is configured to make freshwater from saltwater when the second water pump water pressure acts on the reverse osmosis membrane. This device is a semipermeable membrane that purifies water by trapping contaminants such as dissolved salts, organics, bacteria, and pyrogens. This device may be in the form of a cylindrical tube with standard dimensions of 2.5-4 inches in diameter, and length varying from 14 to 120 inches. These membranes are cost efficient and with proper care can operate on average for 3 to 7 years. A first conduit 146 is attached to the reverse osmosis membrane freshwater outlet. This conduit may be in the form of a hose, pipe, spout, nozzle etc., made from materials such as polyurethane, polypropylene, silicone, etc.

The second water pump outlet is in fluid communication with the reverse osmosis membrane. The second water pump is configured to move water through the reverse osmosis membrane at a second water pump pressure such that fresh water leaves the freshwater outlet. The conduit comprises flexible properties as stated above and is configured to extend outside the portable container providing the user easy access to the clean fresh water. The conduit 151 connecting the saltwater outlet to the water pressure regulator inlet 170 may be in the form of tubing or piping, such as polyvinyl chloride pipes for example. Other pipes and tubing for the conduits or the system may be used and are within the spirit and scope of the disclosure.

While the high-pressure pump is priming (when the system is initially energized), the low-pressure pump forces fluid through the system, and into the self-purging water pressure regulator 160. This fluid forces the trapped air up and into the bypass channel 165 where the bypass channel is configured to purge air 180 from the system before the predetermined amount of water pressure is reached. This process creates back pressure. Once the predetermined amount of water pressure is within the system, the housing assembly inlet or water pressure regulator inlet 170 will have saltwater up to the piston at the innermost channel of the inlet at the predetermined pressure, thereby forcing the piston to move into the open position (as shown in FIG. 2B) allowing salt water to flow out through the water pressure regulator outlet 184. The outlet may have a second conduit 186 attached in the form of tubing or piping with second flexible properties configured to extend outside the portable container to deliver salt water back to the source. A diagram of the forces acting on the self-purging pressure regulator is depicted in FIGS. 2A and 2B.

Figure 2A:
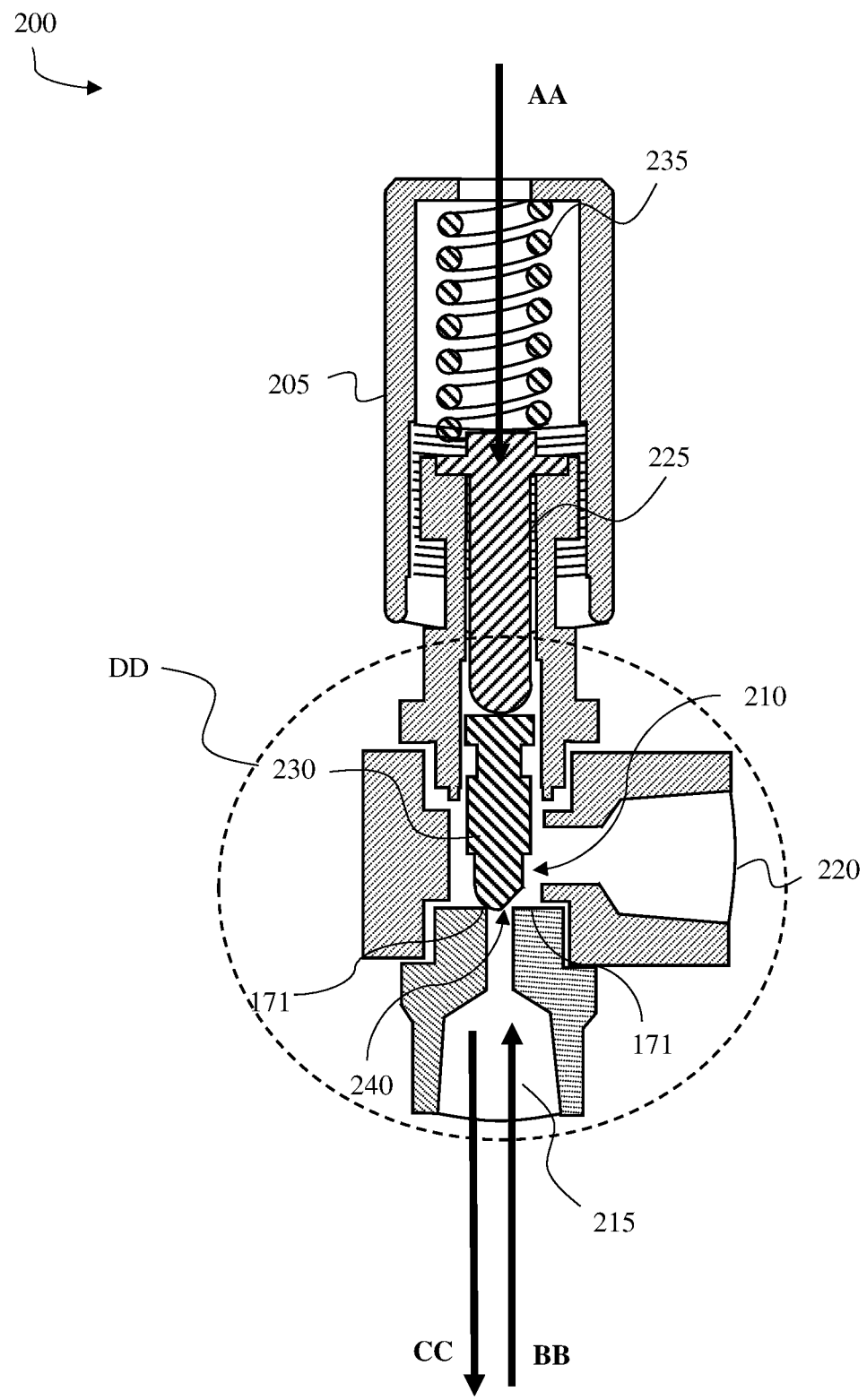
FIG. 2A is a diagram of the forces acting on the self-purging water pressure regulator having the plunger and piston in the closed position, wherein the self-purging water pressure regulator is shown in a cross sectional view, according to an example embodiment.
Figure 2B:
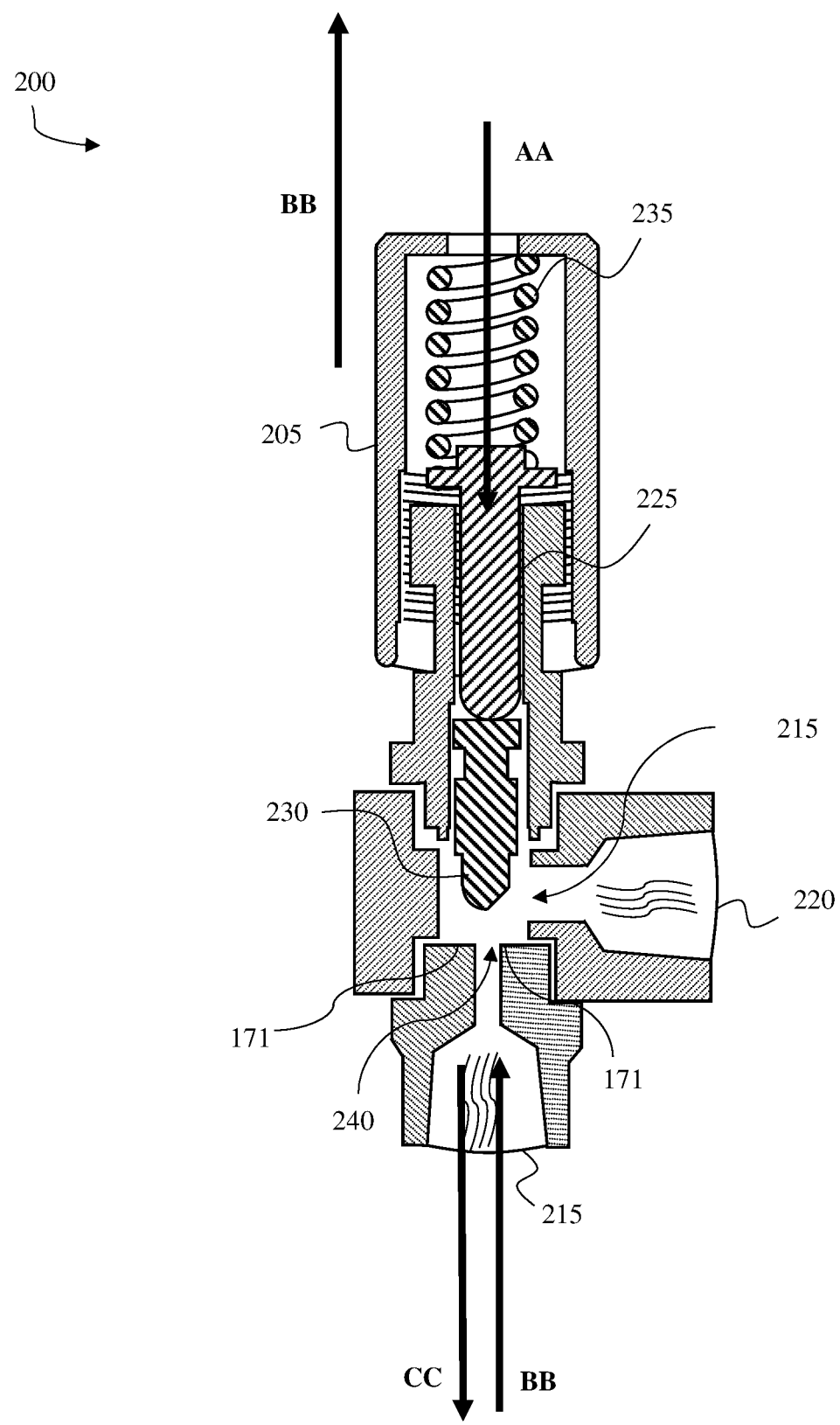
FIG. 2B is a diagram of the forces acting on the self-purging water pressure regulator having the plunger and piston in the open position, wherein the self-purging water pressure regulator is shown in a cross-sectional view, according to an example embodiment.

Referring now to FIGS. 2A and 2B, FIG. 2A shows a cross-sectional view illustrating the self-purging water pressure regulator having the plunger and piston in the closed position, according to an example embodiment, and FIG. 2B shows a cross-sectional view illustrating the self-purging water pressure regulator having the plunger and piston in an open position, according to an example embodiment. The self-purging water pressure regulator 200 includes a housing assembly 205, a chamber 210 within the housing assembly, a housing assembly inlet 215, a housing assembly outlet 220, a plunger 225 within the housing assembly, a piston 230 within the housing assembly, a biasing element 235 within the housing assembly, and a bypass channel 240. The plunger and piston have an open position as illustrated in FIG. 2B and a closed position in FIG. 2A. The chamber is arranged to provide fluid communication between the housing assembly inlet and housing assembly outlet where saltwater and air can travel from the housing assembly inlet, through the chamber, and out of the housing assembly outlet. Additionally, the bypass channel further provides fluid communication between the housing assembly inlet and housing assembly outlet.

Referring to FIG. 2A, the plunger and piston are shown in the closed position. The biasing element 235 applies a first force on the plunger and piston in the first direction or direction AA. The first force is a loading force exerted on the plunger to force the plunger and piston into the closed position. The biasing element may include mechanical springs or hydraulics used to apply the first force on the plunger. The loading force may be attributable to normal mechanical springs or hydraulic pressure. In the closed position the biasing element of the self-purging water pressure regulator exerts a first force in a first direction AA on the plunger and the piston that causes the lower end of the piston to engage the wall 171 of the housing assembly such that the plunger at least partially blocks the fluid communication from the housing assembly inlet to the housing assembly outlet. The plunger partially blocks the fluid communication such that it is configured to allow a buildup of water pressure to reach the predetermine PSI. In FIG. 2A, if the plunger did not have the cutout forming the bypass channel the plunger would fully block fluid and air from passing between the regulator's inlet to the outlet in the closed position. However, the space between the wall 171 and end of the piston forming the bypass channel allows the air and fluid to pass through from the inlet to the outlet even in the closed position. A detailed view of the chamber, piston, inlet and outlet of the water pressure regular is shown, having different embodiments of the bypass channel, in FIGS. 3-6. The detailed view in the figures (FIGS. 3-6) depicts the portion of FIG. 2 encircled by hashed circle DD in FIG. 2.

In one embodiment in the closed position, the piston prevents substantial fluid communication between the housing assembly inlet and housing assembly outlet through the chamber such that the bypass channel is defined by a first cutout 320 on the piston where air may purge from the housing assembly inlet, through the bypass channel, into the chamber, and out the housing assembly outlet. This embodiment is further detailed in FIG. 3.

In another embodiment in the closed position, the piston prevents substantial fluid communication between the housing assembly inlet and housing assembly outlet through the chamber such that the bypass channel is defined by a cutout 420 on a wall 430 of the housing assembly inlet channel proximate to the housing assembly inlet configured to allow air to purge from the housing assembly inlet to the housing assembly outlet. This embodiment is further detailed in FIG. 4.

In another embodiment in the closed position, the piston prevents fluid communication between the housing assembly inlet and housing assembly outlet through the chamber; however, the bypass channel 525 is defined by a channel outside of the chamber such that fluid communication between the housing assembly inlet and housing assembly outlet is maintained to allow air to purge the system. This embodiment is further detailed in FIGS. 5 and 6.

When the plunger and piston are in the closed position and the system is in operation, where the biasing element is applying a first force AA on the plunger, the saltwater moving into the housing inlet applies a second force in a second direction or direction BB against the piston in the closed position. While the second force is less than the first force, the second force creates an equal and opposite back pressure force CC. The back pressure force CC traverses throughout the system through the elements that are in fluid communication with one another, such that the water pressure increases within the reverse osmosis membrane to allow the saltwater to force move across the reverse osmosis membrane and create freshwater exiting the freshwater outlet. When the saltwater force moves across the reverse osmosis membrane the salt ions are trapped within the reverse osmosis membrane allowing only freshwater to permeate the membrane and exit through the freshwater outlet. The back pressure force and the second force continue to increase in magnitude as the saltwater moves from the reverse osmosis membrane outlet to the housing assembly inlet. The back pressure force allows the increased water pressure of the system to remain high such that the second pump can move the saltwater at a high psi from the second pump outlet into the reverse osmosis membrane. The second force exceeds the first force when the second force exceeds a predetermined water pressure. In one embodiment, the predetermined water pressure is 800 psi.

Referring now to FIG. 2B, when the second force exceeds the first force, where the second direction acts in manor BB, it will cause the piston to disengage that wall of the housing assembly, the plunger and piston are in the open position 245. The biasing element is configured to release the plunger and piston from the closed position, such that the spring compresses or the hydraulics release hydraulic pressure for example, allowing fluid communication between the housing assembly inlet and the housing assembly outlet through the chamber. The open position is configured to prevent the back pressure force within the system from becoming too great. When in the open position, saltwater moves from the housing assembly inlet, through the chamber, and out the housing assembly outlet to release pressure from within the system.

Figure 3:
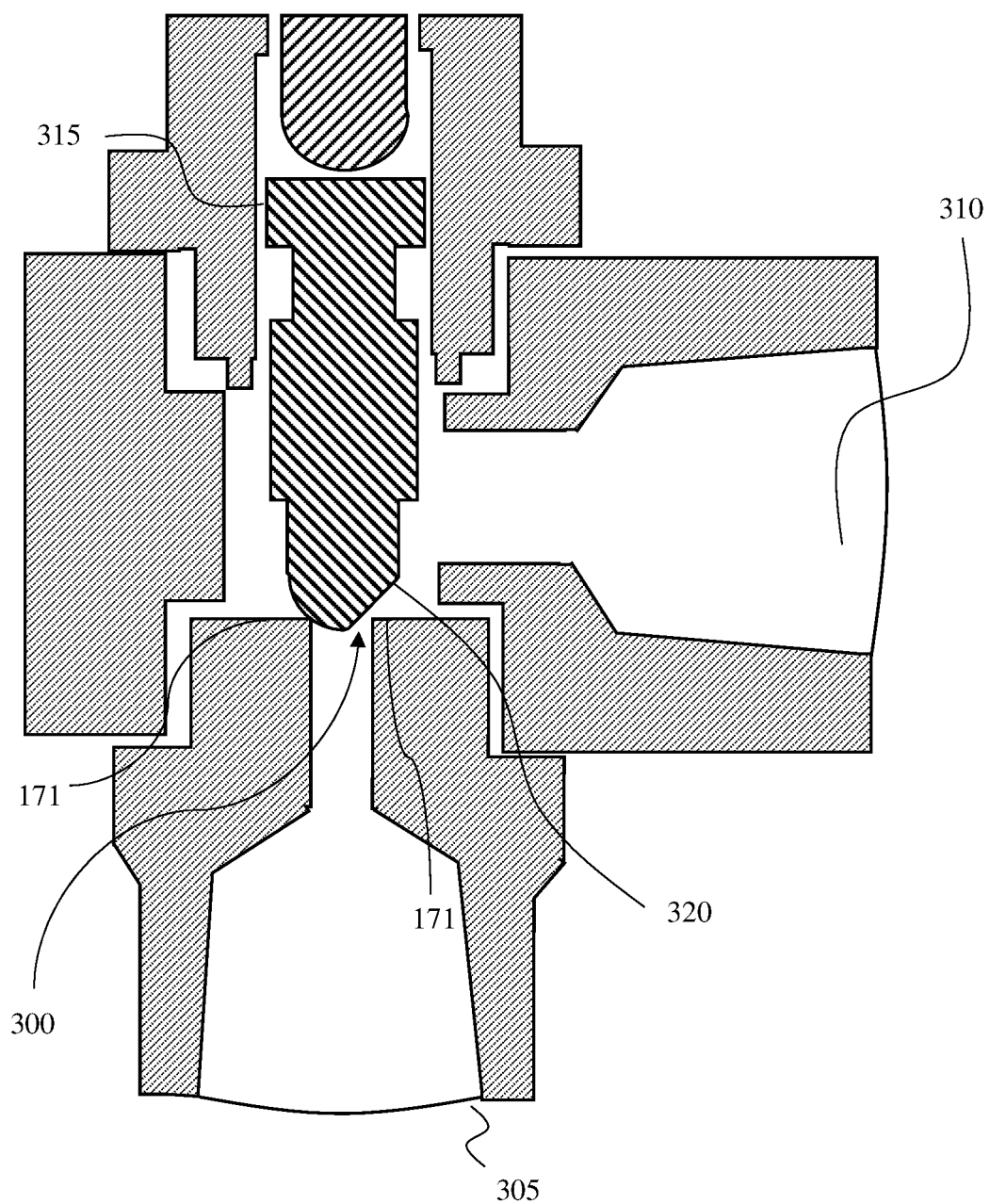
FIG. 3 is a detailed cross-sectional view of the self-purging water pressure regulator having a bypass channel defined by a first cutout on a first end of a piston, according to an example embodiment.

Referring now to FIG. 3, a cross-sectional view of the self-purging water pressure regulator having a bypass channel 300 defined by a first cutout 320 on the piston 315 is shown, according to an example embodiment. In the closed position, the piston prevents substantial fluid communication between the housing assembly inlet 305 and housing assembly outlet 310 through the chamber such that the bypass channel 300 is defined by a first cutout 320 where air may purge from the housing assembly inlet, through the bypass channel, into the chamber, and out the housing assembly outlet while allowing back pressure to build such that the high-pressure water pump become fully operational. The first cutout defining the bypass channel is configured to allow fluid communication between the housing assembly inlet and housing assembly outlet. During operation of the system, the first cutout is also configured to allow air to purge from the housing assembly inlet, through the bypass channel, and out the housing assembly outlet while the plunger and piston are in the closed position while also allowing the system to increase the second force and back pressure force. This increases the efficiency of the system by allowing the second pump to optimally move saltwater at a high pressure and allows the reverse osmosis membrane to force move saltwater for freshwater to permeate the reverse osmosis membrane and out the freshwater outlet.

Figure 4:
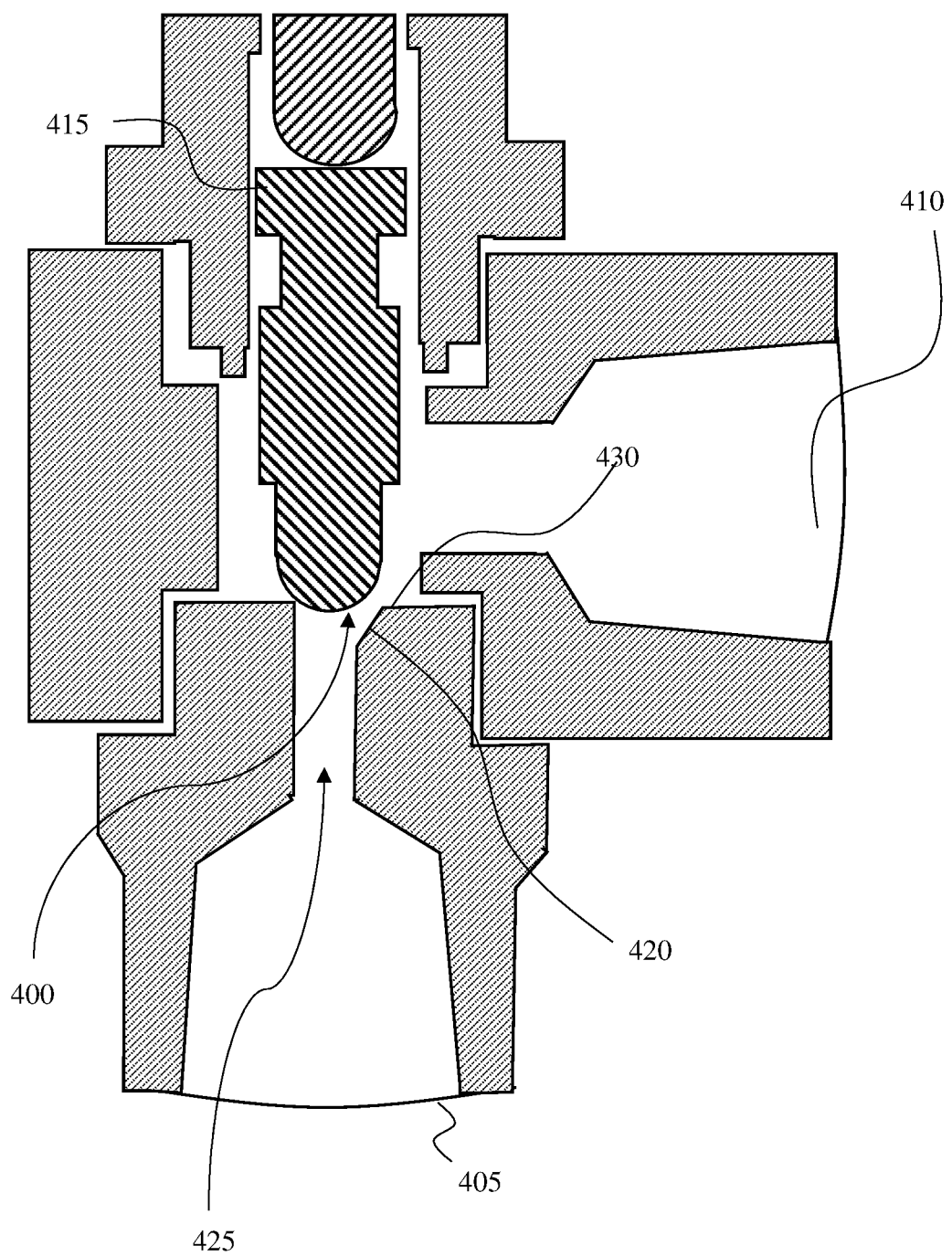
FIG. 4 is a detailed cross-sectional view of the self-purging water pressure regulator having the bypass channel defined by a second cutout on a wall of an inlet channel proximate to the inlet, according to an example embodiment.

Referring now to FIG. 4, a cross-sectional view of the self-purging water pressure regulator having the bypass channel 400 defined by a second cutout on a wall 430 of a housing assembly inlet channel 425 proximate to the housing assembly inlet 405 is shown, according to an example embodiment. The housing assembly inlet 405 having a housing assembly inlet channel 425 where the housing assembly inlet channel is proximate to the piston. In the closed position, the piston prevents substantial fluid communication between the housing assembly inlet 405 and housing assembly outlet 410 through the chamber such that the bypass channel 400 is defined by a second cutout on the wall of the housing assembly inlet channel where air may purge from the housing assembly inlet, through the bypass channel, into the chamber, and out the housing assembly outlet. The second cutout defining the bypass channel is configured to allow fluid communication between the housing assembly inlet and housing assembly outlet. The second cutout is also configured to allow air to purge from the housing assembly inlet, through the bypass channel, and out the housing assembly outlet while the plunger and piston are in the closed position while also allowing the system to increase the second force and back pressure force when during operation and the system is initially turned on. This increases the efficiency of the system by allowing the second pump to optimally move saltwater at a high pressure and allows the reverse osmosis membrane to force move saltwater for freshwater to permeate the reverse osmosis membrane and out the freshwater outlet.

Figure 5:
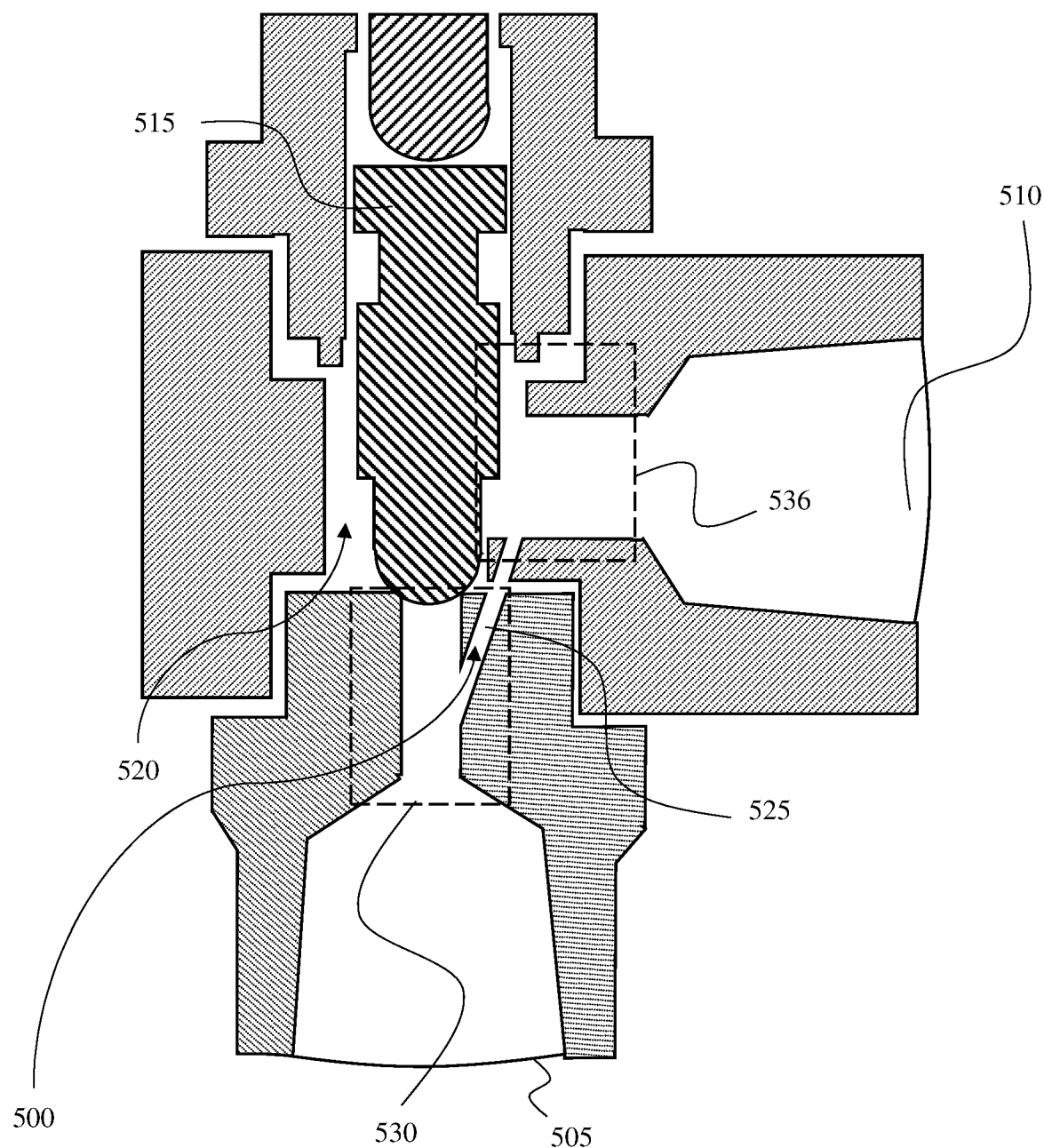
FIG. 5 is a detailed cross-sectional view of the self-purging water pressure regulator having the bypass channel defined by a channel outside of a chamber within the housing of the self-purging water pressure regulator, according to an example embodiment.

Referring now to FIG. 5, a cross-sectional view of the self-purging water pressure regulator having the bypass channel 500 defined by a channel 525 outside of the chamber 520 within the housing of the self-purging water pressure regulator is shown, according to an example embodiment. In the closed position, the piston prevents fluid communication between the housing assembly inlet 505 and housing assembly outlet 510 through the chamber. The bypass channel 500 is defined by a channel 525 outside of the chamber such that fluid communication between the housing assembly inlet and housing assembly outlet is maintained to allow air to purge the system with traveling through the chamber. The channel 525 defining the bypass channel is configured to allow fluid communication between the inlet innermost channel 530 of the housing assembly inlet and an outlet innermost channel 536 of the housing assembly outlet. The second cutout is also configured to allow air to purge from the housing assembly inlet, through the bypass channel, and out the housing assembly outlet while the plunger and piston are in the closed position while also allowing the system to increase the second force and back pressure force. This increases the efficiency of the system by allowing the second pump to optimally move saltwater at a high pressure and allows the reverse osmosis membrane to force move saltwater for freshwater to permeate the reverse osmosis membrane and out the freshwater outlet.

Figure 6:
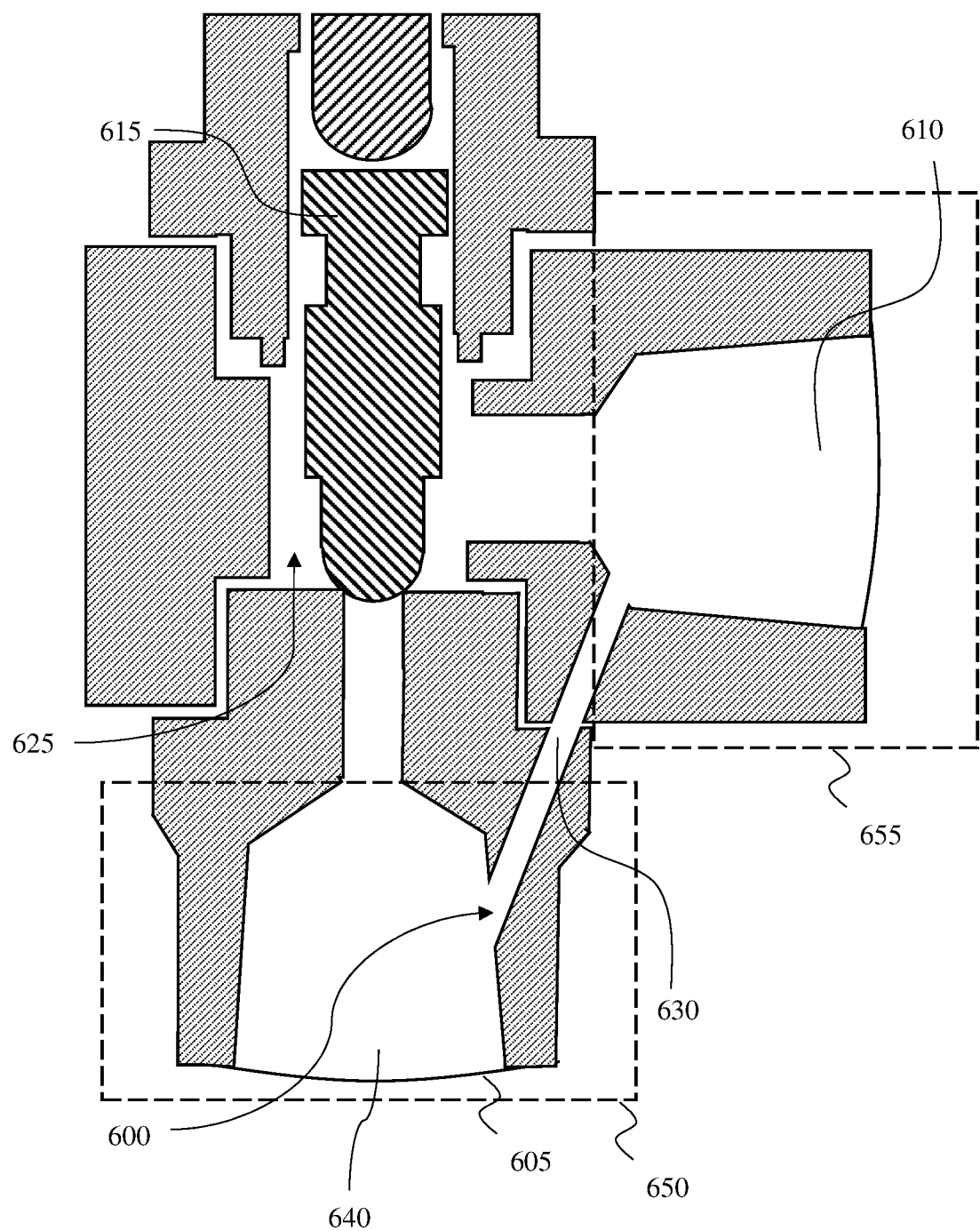
FIG. 6 is a detailed cross-sectional view illustrating of the self-purging water pressure regulator having the bypass channel defined by a channel outside of a chamber within the housing of the self-purging water pressure regulator, according to a second example embodiment.

Referring now to FIG. 6, a cross-sectional view of the self-purging water pressure regulator having the bypass channel 600 defined by a channel 630 outside of the chamber 625 within the housing of the self-purging water pressure regulator is shown, according to an example embodiment. In the closed position, the lower end of the piston 615 prevents fluid communication between the housing assembly inlet 640 and housing assembly outlet 610 through the chamber even in the closed position. The bypass channel is defined by a channel outside of the chamber such that fluid communication between the housing assembly inlet and housing assembly outlet is maintained to allow air to purge the system while traveling through the bypass channel even in the closed position. The channel defining the bypass channel is configured to allow fluid communication between the housing assembly inlet and housing assembly outlet, wherein the bypass channel comprises a pathway that is outside of the chamber. Specifically, the embodiment of FIG. 6 illustrates the bypass channel defined by a channel in fluid communication with an inlet outermost channel 650 of the housing assembly inlet and an outlet outermost channel 655 of the housing assembly or water pressure regulator outlet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A reverse osmosis system having a self-purging water pressure regulator, wherein the reverse osmosis system comprises:
    a first water pump, having a first water pump inlet, a first water pump outlet, and wherein the first water pump is a low-pressure water pump configured for providing a first water pump water pressure;
    a second water pump, having a second water pump inlet, a second water pump outlet, and wherein the second water pump is a high-pressure water pump configured for providing a second water pump water pressure;
    a reverse osmosis membrane having a reverse osmosis membrane inlet, a freshwater outlet, and a saltwater outlet, wherein the reverse osmosis membrane is configured to make freshwater from saltwater when the second water pump water pressure acts on the reverse osmosis membrane;
    the self-purging water pressure regulator in fluid communication with the saltwater outlet, wherein the self-purging water pressure regulator has a bypass channel;
    wherein the first water pump inlet is configured to be in fluid communication with a saltwater source;
    wherein the first water pump outlet is in fluid communication with the second water pump and the reverse osmosis membrane, wherein the first water pump is configured to move saltwater at the first water pump water pressure to the self-purging water pressure regulator through the second water pump and the reverse osmosis membrane;
    wherein the second water pump outlet is in fluid communication with the reverse osmosis membrane and wherein the second water pump is configured move water through the reverse osmosis at a second water pump water pressure such that fresh water leaves the freshwater outlet; and
    wherein the bypass channel is configured to purge air from the reverse osmosis system before a predetermined amount of water pressure is reached.

2. The reverse osmosis system of claim 1, wherein the self-purging water pressure regulator comprises:
    a housing assembly;
    a chamber within the housing assembly;
    a housing assembly inlet;
    a housing assembly outlet;
    a plunger within the housing assembly;
    a piston within the housing assembly;
    a biasing element within the housing assembly;
    a wall within the housing assembly;
    wherein the plunger and the piston have an open position and a closed position;
    wherein in the closed position the biasing element exerts a first force in a first direction on the plunger and the piston that causes the piston to engage the wall of the housing assembly that causes the plunger to at least partially block fluid communication from the housing assembly inlet to the housing assembly outlet;

wherein in the open position a second force, that exceeds the first force, in a second direction acts on the plunger and the piston that causes the piston to disengage the wall of the housing assembly; and wherein the bypass channel provides fluid communication between the housing assembly inlet and the housing assembly outlet even in the closed position.

3. The reverse osmosis system of claim 2, wherein the bypass channel comprises a pathway that is outside of the chamber.

4. The reverse osmosis system of claim 2, wherein the bypass channel comprises a first cutout on a first end of the piston thereby providing fluid communication between the inlet and the outlet.

5. The reverse osmosis system of claim 2, wherein the bypass channel comprises a second cutout on the wall.

6. The reverse osmosis system of claim 3, wherein the second force exceeds the first force when the second force exceeds a predetermined water pressure.

7. The reverse osmosis system of claim 6, wherein the predetermined PSI is at least 700 PSI.

8. The reverse osmosis system of claim 2, wherein the bypass channel is configured to allow the air to continuously escape the housing assembly in the closed position.

9. A portable reverse osmosis system having a self-purging water pressure regulator, wherein the portable reverse osmosis system is at least partially removable housed within a portable container, wherein the portable reverse osmosis system comprises:

a first water pump, having a first water pump inlet, a first water pump outlet, and wherein the first water pump is a low-pressure water pump configured for providing a first water pump water pressure;

a second water pump, having a second water pump inlet, a second water pump outlet, and wherein the second water pump is a high-pressure water pump configured for providing a second water pump water pressure;

a reverse osmosis membrane having a reverse osmosis membrane inlet, a freshwater outlet, and a saltwater outlet, wherein the reverse osmosis membrane is configured to make freshwater from saltwater when the second water pump water pressure acts on the reverse osmosis membrane;

the self-purging water pressure regulator in fluid communication with the saltwater outlet, wherein the self-purging water pressure regulator has a bypass channel;

wherein the first water pump inlet is configured to be in fluid communication with a saltwater source;

wherein the first water pump outlet is in communication with the second water pump and the reverse osmosis membrane;

wherein the first water pump is configured to move saltwater at a first water pump pressure to the self-purging water pressure regulator through the second water pump and the reverse osmosis membrane;

wherein the second water pump outlet is in fluid communication with the reverse osmosis membrane and wherein the second water pump is configured move water through the reverse osmosis at a second water pump pressure such that fresh water leaves the freshwater outlet; and wherein the bypass channel is configured to purge air from the portable reverse osmosis system before a predetermined amount of water pressure is reached.

10. The portable reverse osmosis system of claim 9, wherein the first water pump is a submersible water pump.

11. The portable reverse osmosis system of claim 10, wherein a first conduit attached to the freshwater outlet comprises flexible properties and is configured to extend outside the portable container.

12. The portable reverse osmosis system of claim 11, wherein a second conduit attached to the self-purging water pressure regulator comprises second flexible properties and is configured to extend outside the portable container.

13. The portable reverse osmosis system of claim 9, wherein the bypass channel comprises a pathway that is outside of the chamber.

14. The portable reverse osmosis system of claim 9, wherein the bypass channel comprises a first cutout on a first end of the piston thereby providing fluid communication between the inlet and the outlet.

15. The portable reverse osmosis system of claim 9, wherein the bypass channel comprises a second cutout on the wall.

16. The portable reverse osmosis system of claim 9, wherein the second water pump pressure exceeds the first water pump pressure when the second water pump pressure exceeds a predetermined water pressure.

17. The self-purging water pressure regulator of claim 9, wherein the bypass channel provides a bypass for allowing air to continuously escape the housing assembly even in the closed position.

* * * * *